(12) United States Patent
Chenowth et al.

(10) Patent No.: US 8,240,740 B2
(45) Date of Patent: Aug. 14, 2012

(54) INTERNALLY TRACKED SLIDER SYSTEM FOR LOW PROFILE CONTRACTIBLE CANOPY

(76) Inventors: Lynn Chenowth, Rodeo, NM (US); Rory H. Chenowth, Ramona, CA (US)

(*) Notice: Subject to any disclaimer, the term of this patent is extended or adjusted under 35 U.S.C. 154(b) by 319 days.

(21) Appl. No.: 12/577,098

(22) Filed: Oct. 9, 2009

(65) Prior Publication Data

US 2011/0084513 A1    Apr. 14, 2011

(51) Int. Cl.
B60J 7/06 (2006.01)
B61D 39/00 (2006.01)
B60P 7/02 (2006.01)

(52) U.S. Cl. ......... 296/100.11; 105/377.02; 105/377.09; 135/88.1; 160/84.06

(58) Field of Classification Search ............. 105/377.01, 105/377.02, 377.09; 135/88.01, 88.11, 129; 160/84.01, 84.02, 84.06; 296/100.01, 100.03, 296/100.11, 100.12, 100.13, 100.15, 100.16
See application file for complete search history.

(56) References Cited

U.S. PATENT DOCUMENTS

| | | | | |
|---|---|---|---|---|
| 1,263,759 | A * | 4/1918 | Hanaway | 135/88.09 |
| 1,343,291 | A * | 6/1920 | Test | 105/377.01 |
| 1,718,183 | A * | 6/1929 | Smith | 160/368.1 |
| 2,559,310 | A | 7/1951 | McNavage | |
| 2,610,086 | A * | 9/1952 | Shield | 296/105 |
| 3,820,840 | A | 6/1974 | Forsberg | |
| 4,091,484 | A * | 5/1978 | Means | 114/361 |
| 4,252,363 | A * | 2/1981 | Rodrigue | 296/100.12 |
| 4,397,497 | A * | 8/1983 | Alonzo et al. | 296/165 |
| 4,801,171 | A | 1/1989 | Weaver | |
| 4,854,630 | A * | 8/1989 | Biancale | 296/100.13 |
| 5,026,109 | A * | 6/1991 | Merlot, Jr. | 296/105 |
| 5,050,923 | A | 9/1991 | Petelka | |
| 5,080,422 | A * | 1/1992 | DeMonte et al. | 296/105 |

(Continued)

FOREIGN PATENT DOCUMENTS

DE     3247880 A1 *  6/1984

(Continued)

OTHER PUBLICATIONS

UK Search Report and Written Opinion from corresponding UK Application No. GB1016915.9.

*Primary Examiner* — Glenn Dayoan
*Assistant Examiner* — Paul Chenevert
(74) *Attorney, Agent, or Firm* — Charmasson, Buchaca & Leach, LLP

(57) ABSTRACT

A canopy deployment and retraction mechanism particularly suited to cover the cargo compartment of an elongated vehicle such as a railroad car. Each of a series of tarpaulin-supporting, parallel bows has sliders at each end sliding in a pair of funnel-shaped channels having their flat bases vertically secured to the upper inside lateral wall sections of the compartment. The spacing between the bases of the channels is less than the total length of a bow and its sliders and provides a degree of play in order to accommodate slight variations in the width of said compartment, and allows for self-centering of the cover. The shape of the channels allows for the placement of the cover retraction mechanisms such as cables and sliders within the outer periphery of the container, reducing bulk. The downward slope of the channel lower side further improves the evacuation of debris under the wiping action of the traveling sliders. The upward slope of the channel upper side further improves the sealing of the deployed canopy against the intrusion of rain water.

18 Claims, 3 Drawing Sheets

U.S. PATENT DOCUMENTS

| | | | |
|---|---|---|---|
| 5,253,914 A * | 10/1993 | Biancale | 296/100.13 |
| 5,257,850 A * | 11/1993 | Brim | 296/39.2 |
| 5,538,313 A * | 7/1996 | Henning | 296/100.12 |
| 5,542,460 A * | 8/1996 | McKeon | 160/7 |
| 5,690,377 A | 11/1997 | Denyer | |
| 5,738,160 A * | 4/1998 | Rice | 160/84.06 |
| 5,924,759 A * | 7/1999 | DeMonte et al. | 296/100.12 |
| 6,273,490 B1 | 8/2001 | Haddad, Jr. | |
| 6,340,194 B1 * | 1/2002 | Muirhead et al. | 296/100.06 |
| 6,435,595 B1 | 8/2002 | Chenowth | |
| 6,893,071 B2 * | 5/2005 | Chabot | 296/98 |
| 7,510,230 B2 | 3/2009 | Chenowth | |
| 7,549,695 B2 * | 6/2009 | Royer | 296/100.12 |
| 7,798,553 B2 * | 9/2010 | Beshiri et al. | 296/100.12 |
| 7,993,041 B2 * | 8/2011 | Petelka | 362/485 |
| 2007/0001475 A1 | 1/2007 | Chenowth et al. | |
| 2008/0284199 A1 * | 11/2008 | Chun | 296/100.03 |
| 2009/0121514 A1 | 5/2009 | Remmel | |
| 2010/0327619 A1 * | 12/2010 | Schmeichel et al. | 296/100.16 |

FOREIGN PATENT DOCUMENTS

| | | | |
|---|---|---|---|
| DE | 3340063 A1 * | 5/1985 | |
| EP | 193888 A2 * | 9/1986 | |
| EP | 0786571 | 7/1997 | |
| FR | 2572693 A1 * | 5/1986 | |
| GB | 2332178 | 6/1999 | |
| JP | 06255374 A * | 9/1994 | |
| WO | 2005044620 | 5/2005 | |
| WO | WO 2005044620 A2 * | 5/2005 | |

* cited by examiner

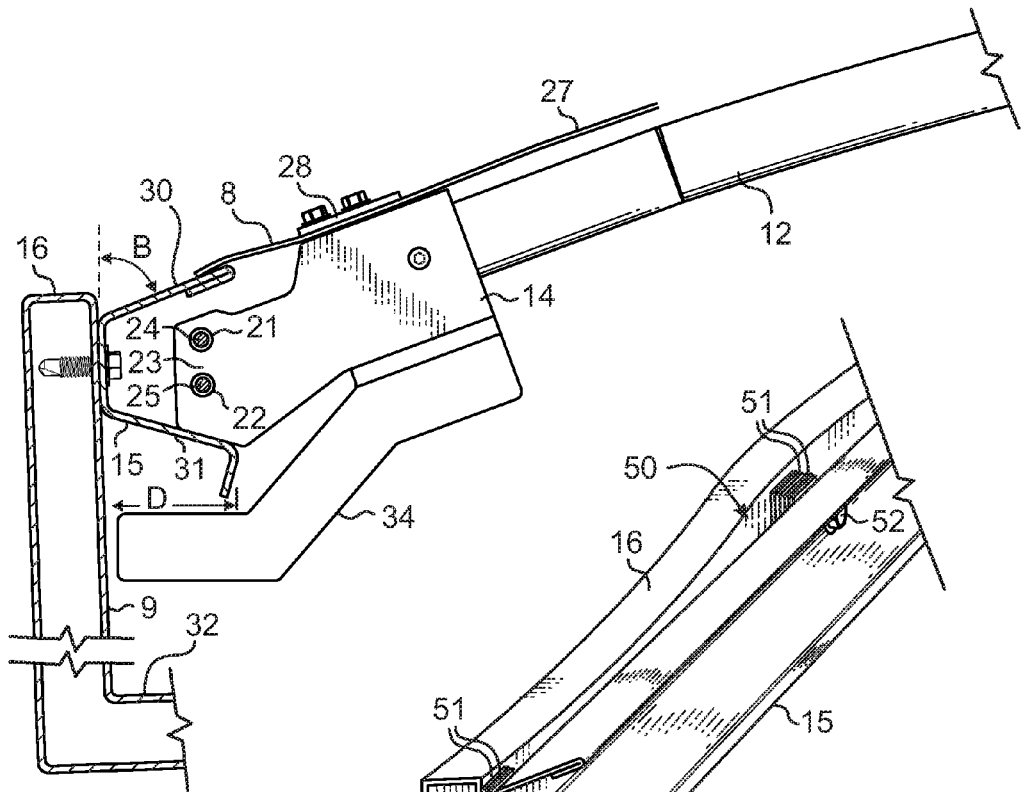
FIG. 4
FIG. 5
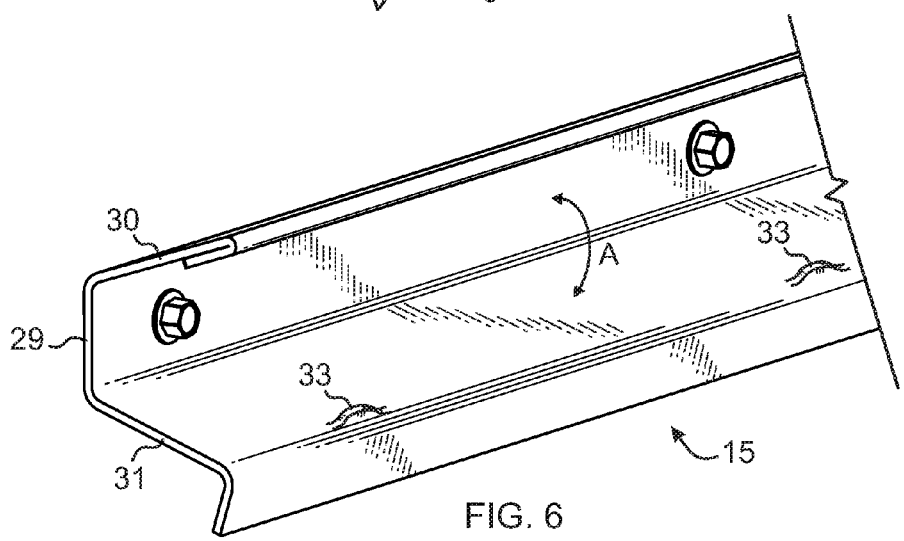
FIG. 6

INTERNALLY TRACKED SLIDER SYSTEM FOR LOW PROFILE CONTRACTIBLE CANOPY

FIELD OF THE INVENTION

This invention relates to apparatuses used to deploy and retract a protective pliable sheet canopy over the cargo compartment of a hauling vehicle and more specifically a long compartment such as those of railroad freight cars.

BACKGROUND

Automatically deploying and retracting covers for hauling vehicle compartments are well represented in the prior art. In the case of trailers and railroad cars, the covering canopy is often supported by a series of spaced apart rigid bows spanning the top of the compartment from side to side. The ends of each bow usually ride along a pair of guiding rails secured to top parts of the hauling compartment as exemplified by the apparatus disclosed in U.S. Pat. No. 3,820,840 Forsberg incorporated herein by reference.

If the compartment sides and their attached guiding rails are not absolutely parallel as often seen in long railroad cars, jamming may occur during deployment or retraction of the canopy.

Jamming can also result from debris entering the guiding rails during loading or unloading of the cargo compartment.

The instant invention provides an elegant and practical way to palliate these conditions.

SUMMARY

The principal and secondary objects of the invention are to provide an improved retractable cover for cargo containers. These and other objects are achieved by an internally tracked cover support system.

In some embodiments, it is provided that in a canopy deployment and retraction mechanism installed over the cargo compartment of a trailer or railroad car, parallel, spaced-apart bows that support a stretched tarpaulin have end sliders engaged into channels secured to the upper edges of the compartment side walls. In some embodiments, the channels have a funnel-shaped cross-section and a base held vertically and at spacing distance slightly greater than the overall length of the bows. In some embodiments, this spacing and the infundibular shape of the channels allow a significant vertical and lateral play of the sliders within the channels in order to accommodate distortions in the parallelism of the compartment edges.

In some embodiments, due to the downward slope of the lower side of the channels, most debris or dust that may enter the channels will automatically slide down toward the inside of the container. In some embodiments, any remainder will be wiped down by the travel of the sliders within the channels.

In some embodiments, there is provided a canopy deployment and retraction mechanism for covering an open-top cargo container having a floor and substantially parallel side walls, wherein a tarpaulin is supported by a series of parallel bows transversally spanning the top of the container, each of said bows being secured at opposite ends to a pair of sliders movable along the upper edges of said walls, an improvement which comprises: each slider including a head projecting outwardly from a distal portion of said slider toward one of said walls; a pair of channels running along said edges, each being shaped, dimensioned and oriented to loosely nest one of said heads; wherein the channels have an infundibular cross-section and a given depth.

In some embodiments, each of said channels comprises a base held in a substantially vertical orientation along one of said edges; and sides divergingly extending from said base.

In some embodiments, the lower one of the sides slopes downwardly toward said floor of the container. In some embodiments, the upper one of said sides slopes upwardly away from said floor.

In some embodiments, the spacing between the channels is greater than the spacing between outer ends of the heads, allowing lateral play of the bows between the channels.

In some embodiments, each head has a pair of bores parallel to the channels, said bores being sized to engage pulling cables.

In some embodiments, each of the channels further comprises series of spaced-apart jogs projecting upwardly from said lower side. In some embodiments, the jogs are dimensioned to retain slacking sections of the cables within the channels.

In some embodiments, the heads occupy about half of the depth of the channels.

In some embodiments, a stabilizing arm projects outwardly from proximal portions of each slider and under and into near contact with the channels.

In some embodiments, the system comprises means for securing edges of the tarpaulin to the sliders. In some embodiments, one or more shims are secured between one of said pair of channels and one of said side walls. In some embodiments, the system comprises a flap of material secured to said sliders, said flap being shaped and dimensioned to extend over and releasably contact an upper one of said sides.

BRIEF DESCRIPTION OF THE DRAWINGS

FIG. 4 is a diagrammatic side view of a guiding channel and slider;

FIG. 5 is a diagrammatic perspective view of some shims bridging gaps formed between a grossly non-linear container side wall and a guiding channel; and FIG. 6 is a diagrammatic perspective view of a fraction of a channel.

DESCRIPTION OF THE EXEMPLARY EMBODIMENTS

Figure 1:
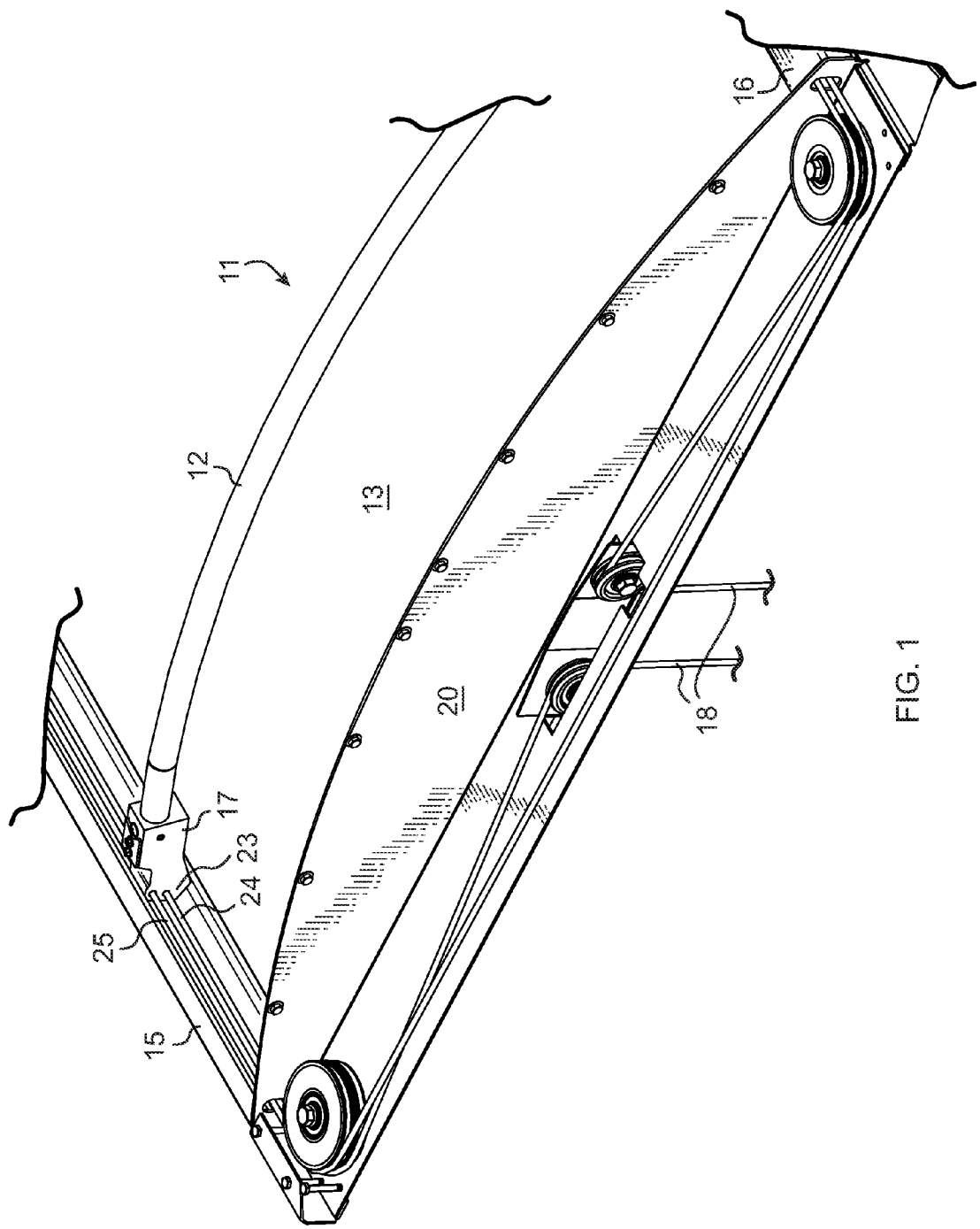
FIG. 1 is a diagrammatic perspective view of part of the front end portion of the canopy cover control mechanism.
Figure 2:
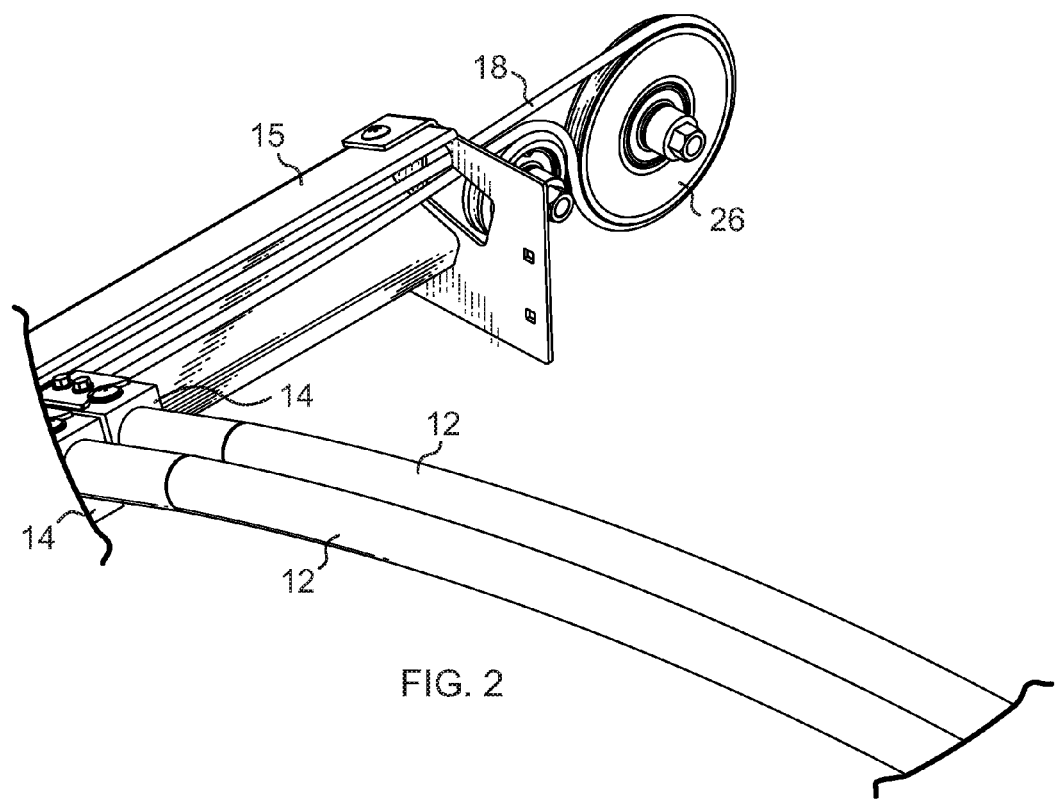
FIG. 2 is a diagrammatic perspective view of part of the rear portion of the mechanism.
Figure 3:
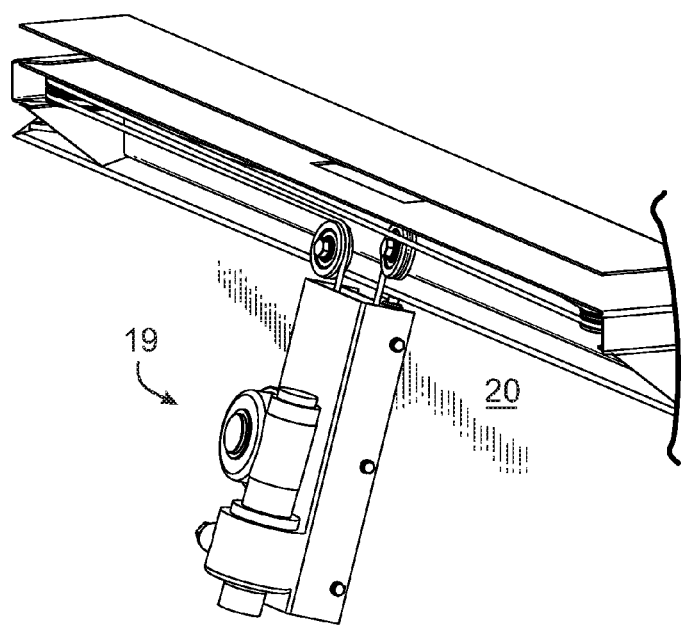
FIG. 3 is a diagrammatic perspective view of the actuating motor and pulley assembly.

Referring now to the drawing, fractions of a railroad car covering mechanism 11 are illustrated in FIGS. 1-3. This cable driven mechanism is akin to the one disclosed in U.S. Pat. No. 6,435,595 Chenowth incorporated herein by this reference.

A series of substantially parallel bows 12 transversally span the top opening of the cargo container 13 of a railroad car. Each bow is terminated at both ends by a slider 14 engaged in one of a pair of channels 15 mounted along the upper edges 16 of the container lateral wall 9 as shown in FIG. 4. The sliders 17 of the leading bow are secured to pull cables 18 driven by the motor and pulley assembly 19 mounted against the leading wall 20 of the container. A pair of longitudinal bores 21, 22, as shown in FIG. 4, are provided through the head 23 of each slider, that is the part projecting outwardly from the distal part of the slider into and in contact with the channel 15. The bores are engaged by the pulling section 24, and return section 25 of the cable 18 after it passes through one of the return pulley assemblies 26 installed at the rear of the container.

As more specifically illustrated in FIGS. 4 and 6, each channel 15 preferably has a defined substantially infundibular cross-section comprising a bottom base 29 held in a substantially vertical orientation and secured to the upper edge 16 of one of the side walls of the container, an upper side 30 and a lower side 31. The sides extend inwardly from the edges of the base in diverging directions—the upper side upwardly at an acute angle B from the vertical, and the lower side sloping downwardly an obtuse angle A toward the floor 32 of the container 13.

As shown in FIG. 4, a pliable sheet tarpaulin 27 has its edges secured to the top of each slider by a plate-and-bolt tie 28. A flap 8 of material such as the loose lateral edge of the tarpaulin can be made to extend a distance over and releasably contact the upper side 30 of the channel 15. In this way, the open top of the container is substantially sealed against rain water or other possible contaminants to the load, and against the load escaping from the container due to wind or vibration.

The head 23 of the slider loosely nests in the median region of the channel. The head is dimensioned to allow a degree of lateral play of the head of approximately one-half the depth D of the channel. Typically, that play ranges between about three to ten centimeters (1.25 to 4 inches) just enough to accommodate expected variations in the parallelism of the container side walls.

As shown in FIG. 5, gross variations in the parallelism of the container side walls can be further accommodated by inserting a number of shims 51 in the gaps 50 between a channel 15 and the container side wall 9. The shims are preferably secured in place by engagement by channel-to-wall attachment bolts 52.

As shown in FIG. 6, low-lying, spaced-apart jogs 33 are provided along the length of the lower side 31. These jogs projecting upwardly into the channel are dimensioned to retain any slacking section of the cable 18 within the channel so that it is not caught by matters being loaded or unloaded and thus damaged or pulled out of place to encourage jams.

An optional stabilizing arm 34 projects outwardly and downwardly from the slider under the lower side 31 of the channel to prevent the slider from escaping upwardly out of the channel while, at the same time, increasing the longitudinal stability of the bows.

In this way, the combined action of the pair of inwardly sloping sides on either side of the container causes the bows to automatically center between the rails and thus reduce jams. Thus oriented, debris located in the channel can be pushed out of the channel and into the container by longitudinal movement of the sliders. Further, the cover mechanisms including cables and sliders, can be located below the upper rim of the container and thus be protected and reduce container bulk. Locating the cover mechanisms internally also provides for reduced aerodynamic drag and allows container manufacturers to maximize container dimensions while still following government size restrictions.

Alternately, the angle A formed between the lower side and base of the channel cross-section can be right, i.e. 90 degrees, or even acute. The disadvantage of a right or acute angle is that there is a greater chance of fouling due to accumulated debris and there may be no automatic self-centering action. The advantage of an acute angle is that any slack cable sections between the sliders can typically be retained in the channels.

Alternately, the angle B formed between the upper side and base of the channel cross-section can be right, i.e. 90 degrees, or even obtuse. The disadvantage of a right or obtuse angle is that rain water will not readily run off the deployed cover. Alternately, the flap 8 of material can be made to extend over the upper edges 16 of the container lateral walls.

Alternately, a channel may be employed which does not have an upper side. The advantage of no upper side would be a reduction in material. The disadvantage would be loss of protection for the cable runs and slider heads and lack of a surface preventing unwanted vertical movement of the slider heads.

While the exemplary embodiments of the invention have been described, modifications can be made and other embodiments may be devised without departing from the spirit of the invention and the scope of the appended claims.

The invention claimed is:

1. A canopy deployment and retraction mechanism comprises:
    an open-top cargo container having a floor and side walls having substantially parallel upper edges;
    a series of substantially parallel bows transversally spanning the top of the container, each of said bows being secured at opposite ends to a pair of sliders movable along the upper edges of said walls;
    each of said sliders including ahead projecting outwardly from a distal portion of said slider toward one of said walls;
    a pair of channels running along said edges, each being shaped, dimensioned and oriented to loosely nest one of said heads;
    wherein at least one of said channels has a defined cross-section comprising a side sloping downwardly toward said floor.

2. The mechanism of claim 1, wherein said defined cross-section is infundibular and wherein said at least one of said channels has a given depth.

3. The mechanism of claim 1, wherein the spacing between said channels is greater than the spacing between outer ends of said heads, allowing lateral play of said bows between said channels.

4. The mechanism of claim 1, wherein at least one of said heads has a pair of bores parallel to said at least one of said channels, said bores being sized to engage pulling cables.

5. The mechanism of claim 1, which further comprises:
    a cable connected to a leading one of said bows;
    said cable running through said at least one of said channels; and,
    wherein said at least one of said channels further comprises:
        series of spaced-apart jogs projecting upwardly from said side, said jogs being dimensioned to retain slacking sections of said cables within said at least one of said channels.

6. The mechanism of claim 1, wherein said heads occupy about half of said depth.

7. The mechanism of claim 1, which further comprises a stabilizing arm projecting outwardly from proximal portions of at least one of said sliders and under and into near contact with one of said channels.

8. The mechanism of claim 1, which further comprises a tarpaulin secured to said sliders.

9. The mechanism of claim 1, wherein one or more shims are secured between one of said pair of channels and one of said side walls.

10. The mechanism of claim 1, wherein said channels have an infundibular cross-section and a given depth.

11. The mechanism of claim 10, wherein said heads occupy about half of said depth.

12. The mechanism of claim 10, which further comprises a stabilizing arms projecting outwardly from proximal portions of said sliders and under and into near contact with said channels.

13. The mechanism of claim 10, wherein each of said heads has a pair of bores parallel to one of said channel, said bores being sized to engage pulling cables.

14. The mechanism of claim 13, wherein each of said channels further comprises series of spaced-apart jogs projecting upwardly from said lower side, said jogs being dimensioned to retain slacking sections of said cables within said channels.

15. The mechanism of claim 10, wherein each of said channels comprises:
   a base held in a substantially vertical orientation along one of said edges; and
   sides divergently extending from said base.

16. The mechanism of claim 15, wherein a lower one of said sides slopes downwardly toward said floor.

17. The mechanism of claim 15, wherein an upper one of said sides slopes upwardly away from said floor.

18. The mechanism of claim 15, which further comprises a flap of material secured to said sliders, said flap being shaped and dimensioned to extend over and releasably contact an upper one of said sides.

\* \* \* \* \*

UNITED STATES PATENT AND TRADEMARK OFFICE
CERTIFICATE OF CORRECTION

PATENT NO. : 8,240,740 B2
APPLICATION NO. : 12/577098
DATED : August 14, 2012
INVENTOR(S) : Lynn Chenowth et al.

It is certified that error appears in the above-identified patent and that said Letters Patent is hereby corrected as shown below:

In the Claims

Column 4, line 31 (Claim 1, line 9) "ahead" should be changed to -- a head --.

Signed and Sealed this
First Day of October, 2013

Teresa Stanek Rea
*Deputy Director of the United States Patent and Trademark Office*